W. H. JONES.
ICE CREAM FREEZER.
APPLICATION FILED DEC. 31, 1914.

1,162,368.

Patented Nov. 30, 1915.
2 SHEETS—SHEET 1.

WITNESSES
T. E. Arthur
W. F. Keefer

INVENTOR—
W. H. Jones
BY
H. E. Dunlap
ATTORNEY.

W. H. JONES.
ICE CREAM FREEZER.
APPLICATION FILED DEC. 31, 1914.
1,162,368.
Patented Nov. 30, 1915.
2 SHEETS—SHEET 2.
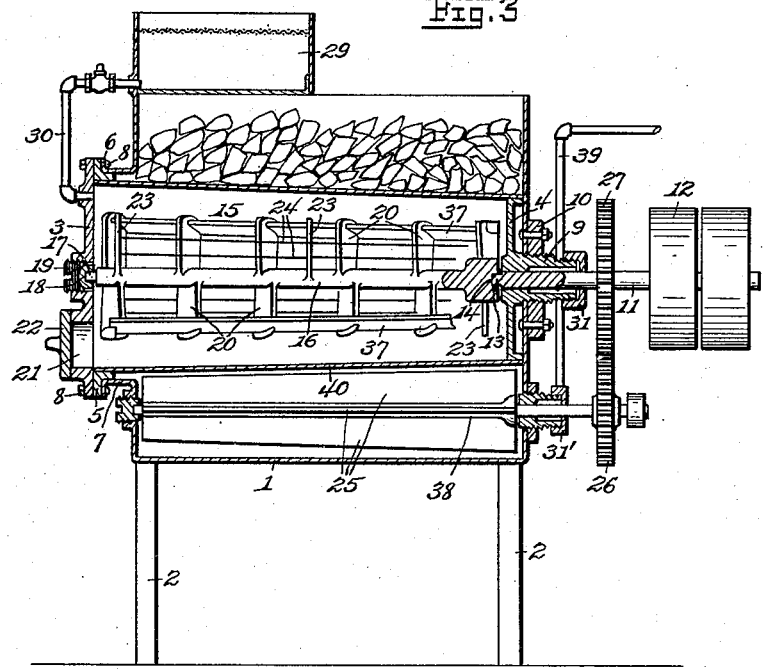
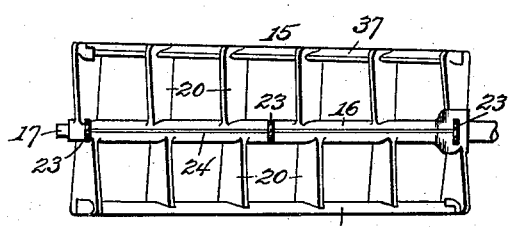
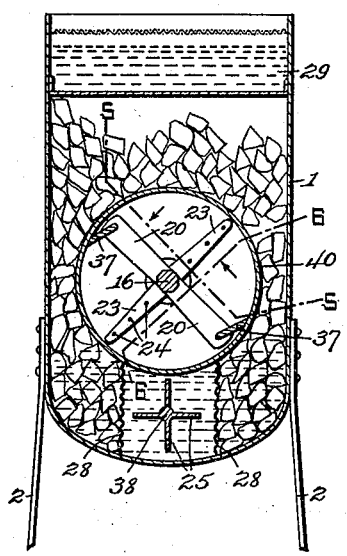
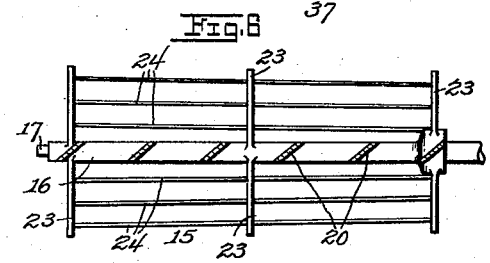
WITNESSES:
INVENTOR—
W. H. Jones.
BY
ATTORNEY.

UNITED STATES PATENT OFFICE.

WILLIAM H. JONES, OF YOUNGSTOWN, OHIO.

ICE-CREAM FREEZER.

1,162,368.　　　　　　　Specification of Letters Patent.　　Patented Nov. 30, 1915.

Application filed December 31, 1914. Serial No. 879,822.

*To all whom it may concern:*

Be it known that I, WILLIAM H. JONES, a citizen of the United States of America, and resident of Youngstown, county of Mahoning, and State of Ohio, have invented certain new and useful Improvements in Ice-Cream Freezers, of which the following is a specification.

This invention relates broadly to ice-cream freezers, and more particularly to an apparatus for freezing liquids, as in the production of ice-cream, ices and the like.

The primary object of the invention is to provide an apparatus for the freezing of liquids in which refrigeration is accomplished with unusual rapidity, and which is adapted to deliver the frozen material in a substantially continuous stream.

A further object of the invention is to provide in a freezer of large capacity means for rapidly agitating the brine to obtain refrigeration of a highly efficient character. And a still further object within the contemplation of the invention is to simplify and structurally improve that type of freezers in which the refrigeration of liquids and the delivery thereof is a practically continuous performance.

With these and other objects in view, the invention resides in the features of construction, arrangement of parts, and combinations of elements which will hereinafter be fully described, reference being had to the accompanying drawings, forming a part of this specification, in which—

Figure 1:
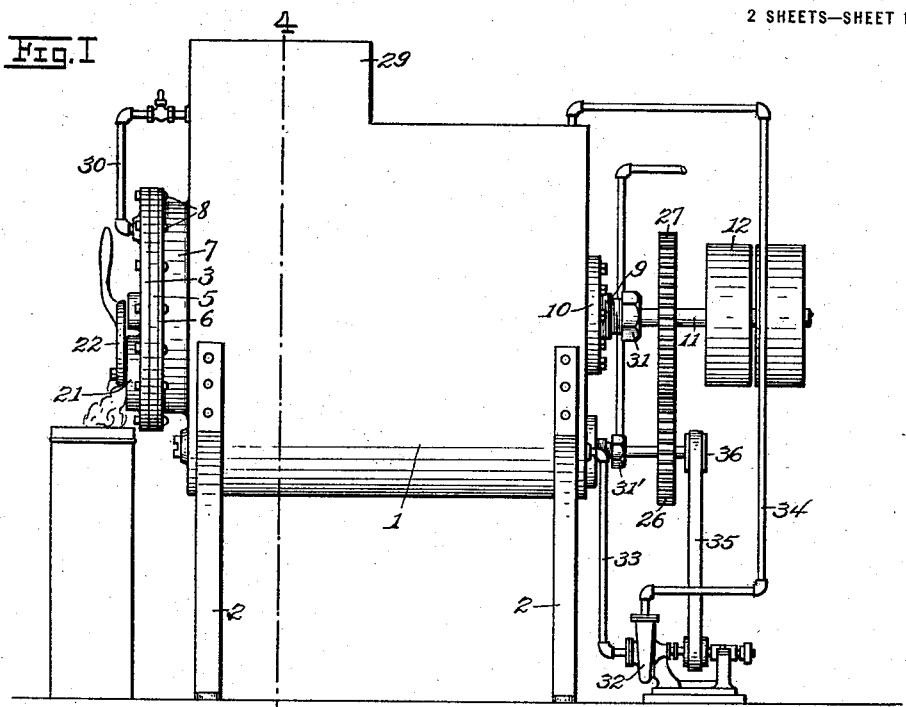
Figure 2:
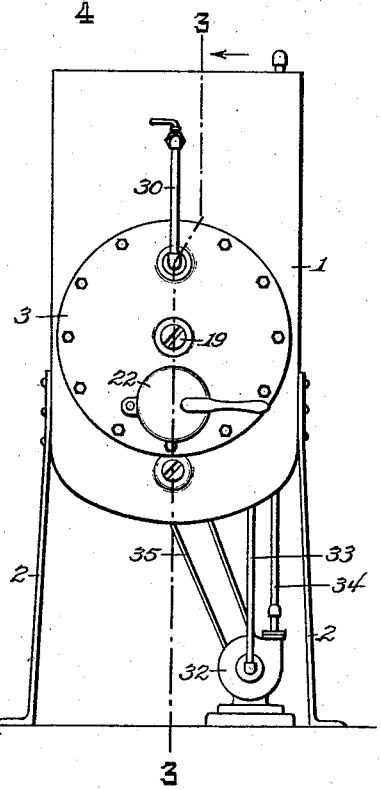

Figure 1 is a side elevation of the invention; Fig. 2 is a front end elevation of the same; Fig. 3 is a longitudinal section taken substantially on the line 3—3, Fig. 2; Fig. 4 is a cross section on the line 4—4, Fig. 1; Fig. 5 is a longitudinal sectional view of the agitating device which operates within the cylinder, said section being taken on line 5—5, Fig. 4; and Fig. 6 is a similar section taken on the line 6—6, Fig. 4.

Referring to said drawings, in which like designating characters distinguish like parts throughout the several views, 1 indicates a casing which is suitably supported, as upon legs 2. Mounted in a central position within said casing is a longitudinally extending hollow freezing cylinder or can 40 within which refrigeration of the liquid is accomplished, said can being preferably of a slightly tapered form and having suitably attached heads 3 and 4 at its front and rear ends, respectively.

A collar 5, preferably L-shaped in cross section, closely embraces the front end of the can, and seated against the front and rear faces, respectively, of the upright portion of said collar is said head 3 and a flange 6 formed on a cylindrical neck portion 7 which extends forward from the front end of the casing 1, bolts 8 being directed through said head 3, collar 5 and flange for maintaining the assembled relation of said parts.

The head 4 has a central outwardly extending hollow boss or sleeve 9 which protrudes through the rear end of the casing 1 and which is exteriorly threaded for the reception of a nut or collar 10 by means of which said head is maintained in rigid relation to said casing. Journaled within said sleeve 9 is one end of a shaft 11 to which rotation is communicated from a source of motive power, as through a belt connected to a pulley 12 fixed on said shaft. Detachably coupled to said shaft 11, as by a square-ended stem 13 formed on said shaft seated in a similarly shaped socket 14 provided in its end, is an agitating device which is herein designated in a general way by the numeral 15 and which comprises an axis or shaft 16, on one end of which said socket 14 is formed. The opposite end of said shaft 16 has formed thereon a spindle 17 rotatably mounted in a socket 18 provided in an exteriorly threaded plug 19 which is adjustable in the head 3 of the freezer can. Carried by the axial shaft 16 is a plurality of inclined blades 20 which act to stir the mixture in the can during the freezing process and which, additionally, serve, when said mixture is in a frozen condition, to convey forward and deliver the latter through a discharge opening or spout 21 provided in the head 3, said opening or spout being normally maintained closed by a pivoted closure or valve plate 22. Said conveyer blades 20 are preferably disposed in two or more series, the blades of each series being in alinement. Carried on the outer ends of the blades of each series is a longitudinally extending scraping blade 37 adapted, when the agitating device 15 is rotated, to scrape against the inner surface of the can, as illustrated in Fig. 4. Also carried by said axial shaft 16 is one or more series of longitudinally alined arms 23, each series supporting a plurality of slender rods or wires 24 designed to stir and smooth the frozen material.

Located between the curved bottom of the casing 1 and the under side of the freezer can is a brine agitator which consists of a shaft 38 carrying a plurality of longitudinally disposed blades or paddles 25, said shaft having its opposite ends suitably journaled in opposite ends of the casing, as shown in Fig. 3. Said agitator is propelled in any suitable manner, as by intermeshing gears 26 and 27 carried, respectively, by the shaft 38 outside the casing and by the shaft 11. Open wire screens 28 disposed on opposite sides of the agitator between the bottom of the casing and the under side of the can serve to prevent ice introduced within the casing about said can from interfering with the rotation of said agitator. Said agitator has a forwardly tapered form, as shown in Fig. 3, such form being required when the rearwardly tapered form of can is employed, it being desirable that the blades 25 thereof operate close to the body of the can.

Located upon the top of the casing 1 is a receptacle 29 in which the mixture, or batch, to be frozen is preliminarily placed. Communication is had between said receptacle and the can through a valve closed pipe 30 having one end opening into the bottom of said receptacle and its opposite end opening into the can through the head 3.

Suitable packing and compressing glands 31 and 31' therefor are provided on the shafts 11 and 38 for preventing leakage through the shaft bearings.

While the brine agitator hereinbefore described will ordinarily be found sufficient for agitating the brine and providing efficient refrigeration, a pump, as 32, may, additionally, be provided should it be desired to produce a greater circulation of the brine. Said pump is connected by a pipe 33 to the lower part of the interior of the casing, and a pipe 34 leads therefrom into the upper part of the casing. The pump may be driven in any appropriate manner, as by a belt 35 driven from a pulley 36 on the outer end of shaft 38. An overflow pipe 39 of any suitable height may be provided for carrying off excess brine.

As is obvious from the foregoing description, the agitating and scraping device which rotates within the freezer can acts to effectively stir the material admitted to said can through the pipe 30 whereby a uniform freezing of said material is effected. The inclined blades 20 thereof further tend to feed the frozen material forward toward the delivery end of the can, and serve to force it through the opening or spout 21 when the valve plate 22 is moved to a position opening the latter. Passing through said spout, the material may drop directly to a suitably placed can 41 or other package, as shown in Fig. 1. The agitator for the brine, or cooling agent, revolves rapidly, producing a circulation about the can which tends to effect prompt or rapid refrigeration of the material, which refrigeration is substantially uniform throughout the length of the can.

It will be noted that the can is wholly closed while in use. Therefore, the necessity for disassembling the parts for cleaning at frequent intervals is dispensed with, such cleaning being required only in the event that the apparatus is to remain idle for a time. When access to the interior of the can is desired, the bolts 8 are removed and the head 3 moved aside, whereupon the can and agitator 15 may be readily withdrawn through the front end of the casing. As is apparent, when the can is withdrawn, ready access to the interior of the casing may be had for cleaning the latter.

What is claimed is—

1. An ice cream freezer comprising a casing, a cylinder mounted longitudinally therein, and spaced therefrom, spaced foraminous partitions mounted on the bottom of the casing and having their upper edges engaged with the cylinder, the space between the partitions being for the reception of a liquid refrigerant, and an agitator mounted in said space for agitating the liquid refrigerant.

2. An ice cream freezer comprising a casing, a freezing chamber mounted in the casing and spaced therefrom, the space around the freezing chamber being for the reception of a liquid refrigerant and a solid refrigerant, an agitator mounted to rotate in the casing adjacent the freezing chamber, and means for preventing the solid refrigerant from interfering with rotation of the agitator.

3. An ice cream freezer comprising a casing, a freezing cylinder mounted within said casing and spaced therefrom to provide an ice-containing chamber between said cylinder and said casing, spaced foraminous partitions interposed between the casing and the lower part of said cylinder to provide an intermediate space for a liquid refrigerant, and an agitator located in said space and having its ends journaled in the opposite ends of the casing to rotate for agitating the liquid refrigerant.

4. An ice cream freezer comprising a casing, a freezing cylinder mounted within said casing and spaced therefrom to provide an ice-containing chamber between said cylinder and said casing, spaced foraminous partitions interposed between the casing and the lower part of said cylinder to provide an intermediate space for a liquid refrigerant, and a rotatable element journaled in the space between the partitions whereby the liquid refrigerant is agitated.

In testimony whereof I affix my signature in presence of two subscribing witnesses.

WILLIAM H. JONES.

Witnesses:
D. W. MUMAW,
J. V. MURPHY.